US006447948B1

United States Patent
Revak et al.

(10) Patent No.: US 6,447,948 B1
(45) Date of Patent: Sep. 10, 2002

(54) JAR FOR INDUSTRIAL ELECTRIC STORAGE BATTERY

(75) Inventors: David M. Revak, High Point; Amy G. Stewart, Linwood, both of NC (US)

(73) Assignee: Accuma Corporation, Statesville, NC (US)

( * ) Notice: Subject to any disclaimer, the term of this patent is extended or adjusted under 35 U.S.C. 154(b) by 0 days.

(21) Appl. No.: 09/540,131

(22) Filed: Mar. 31, 2000

(51) Int. Cl.$^7$ .............................................. H01M 2/02
(52) U.S. Cl. ...................................... 429/176; 429/186
(58) Field of Search .............................. 429/176, 186, 429/208

(56) References Cited

U.S. PATENT DOCUMENTS

| | | | |
|---|---|---|---|
| 945,397 A | * | 4/1910 | Kennedy ................. 429/186 X |
| 1,508,428 A | * | 9/1924 | Wagner ...................... 429/176 |
| 1,919,341 A | * | 7/1933 | Marsden ..................... 429/186 |
| 3,338,452 A | * | 8/1967 | Oakley et al. ........... 429/186 X |
| 3,661,646 A | * | 5/1972 | Barret ..................... 429/186 X |
| 4,276,360 A | | 6/1981 | Hardigg et al. |
| 4,380,577 A | | 4/1983 | Hardigg |
| 4,939,047 A | * | 7/1990 | Nagashima ............. 429/186 X |
| 5,466,316 A | | 11/1995 | Hardigg et al. |
| 5,788,719 A | | 8/1998 | Kump et al. |
| 5,876,873 A | | 3/1999 | Mattan |
| 6,210,829 B1 | * | 4/2001 | Hardigg .................. 429/186 X |

* cited by examiner

Primary Examiner—Stephen Kalafut
(74) Attorney, Agent, or Firm—Adams, Schwartz & Evans, P.A.

(57) ABSTRACT

A plate support bridge for an electric storage battery cell jar having a base, adjacent perpendicular side walls and opposite parallel side walls, and including a plurality of elongate support members positioned on the base of the jar for supporting at least one battery plate in spaced-apart relation above the base. A first array of said support members is provided having a first end adjacent to one of the side walls of the jar and extending outwardly from said side wall at an oblique angle thereto and terminating at a second end remote from any side wall of the jar. The first array of support members is spaced-apart from each other at all points along their respective lengths. A second array of said support members is provided and is positioned intermediate said side walls and has at least one segment positioned at an angle oblique to said side walls. The second array of support members is spaced-apart from each other at all points along their respective lengths. The first array of said support members and said second array of said support members are collectively spaced on the base of the jar to support each of the plates therein.

15 Claims, 5 Drawing Sheets

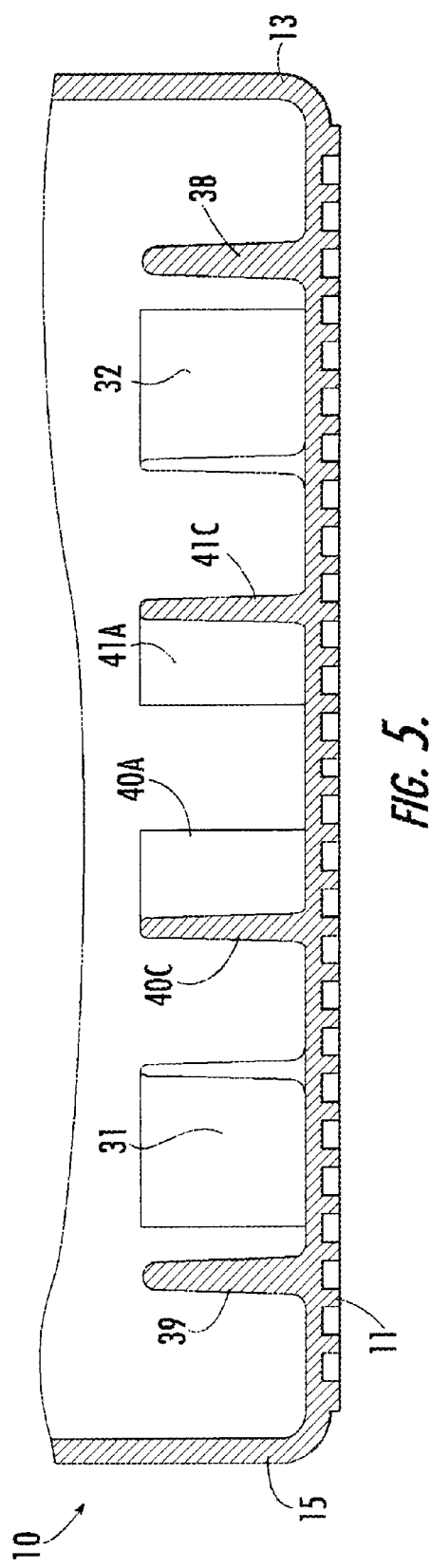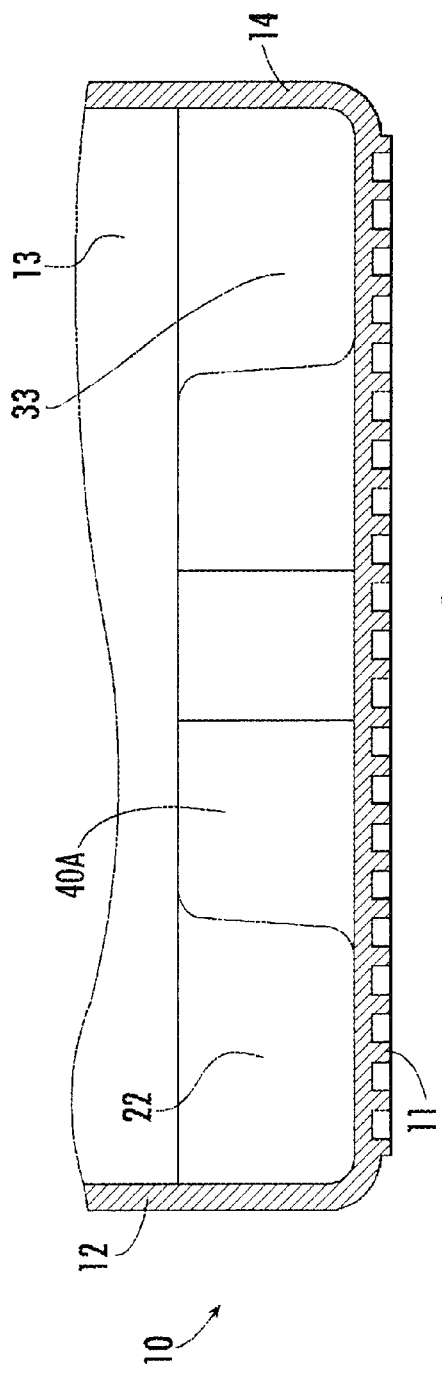

US 6,447,948 B1

JAR FOR INDUSTRIAL ELECTRIC STORAGE BATTERY

TECHNICAL FIELD AND BACKGROUND OF THE INVENTION

This invention relates to a jar for an industrial electric storage battery. Such jars form the outer cases for motive power traction batteries such as used on forklift and similar vehicles. Such vehicles generally utilize large arrays of powerful cells electrically connected in series to collectively form a battery. The battery is connected by heavy-duty cables to electric traction drive motors and hydraulic motors. These batteries generally operate at 12, 24, 36 or 48 volts. The term "jar" typically refers to a relatively tall, molded plastic case in which battery plates are contained, and which form the electricity-generating mechanism of each cell. As noted above, an array of many such cells are electrically connected to function as a battery.

The plates placed within each jar are supported above the base of the jar in order to prevent sediment settling on the base of the jar from shorting out the plates. The plates are supported by a bridge, i.e., a series of raised ridges projecting upwardly from the base. By spacing the plates above the base of the jar, contact between the plates and any sediment on the base is prevented. The bridge may be a separate element resembling a grid which is placed in the bottom of the jar, or integrally-molded ridges which space the plates above the base of the jar.

Prior art bridges have tended to be formed of raised parallel ridges which are relatively long in relation to the total width and length of the base of the jar. These designs sometimes result in premature failures when sediment collects in dead spaces such as corners or where long walls intersect. If sediment collects to such a depth as to contact the plates, shorting between the plates and failure of the cell can result.

SUMMARY OF THE INVENTION

Therefore, it is an object of the invention to provide a support bridge which supports battery cell plates above the base of the cell jar.

It is another object of the invention to provide a support bridge which reduces battery cell failure by preventing sediment from accumulating unevenly along the support members which comprise the bridge.

It is another object of the invention to provide a support bridge which is formed of support members which are angles in such a way as to prevent dead spaces around the supports of the bridge and thus promote even accumulation of sediment in the bottom of the jar.

These and other objects of the present invention are achieved in the preferred embodiments disclosed below by providing a plate support bridge for an electric storage battery cell jar having a base, adjacent perpendicular side walls and opposite parallel side walls, and comprising a plurality of elongate support members positioned on the base of the jar for supporting at least one battery plate in spaced-apart relation above the base. A first array of said support members is provided having a first end adjacent to one of the side walls of the jar and extending outwardly from said side wall at an oblique angle thereto and terminating at a second end remote from any side wall of the jar. The first array of support members is spaced-apart from each other at all points along their respective lengths. A second array of said support members is provided and is positioned intermediate said side walls and has at least one segment positioned at an angle oblique to said side walls. The second array of support members is spaced-apart from each other at all points along their respective lengths. The first array of said support members and said second array of said support members are collectively spaced on the base of the jar to support each of the plates therein.

According to one preferred embodiment of the invention, a third array of support members is positioned in spaced-part relation to each of the side walls, parallel to at least one of said side walls and perpendicular to at least one of said side walls.

According to another preferred embodiment of the invention, said second array of support members includes at least one segment extending at an oblique angle to said side walls and at least one segment extending parallel to at least one of said side walls and perpendicular to at least one of said side walls.

According to yet another preferred embodiment of the invention, each of the support members which extend at oblique angles to said side walls have a length which is less than one half of the distance between opposing side walls.

A According to yet another preferred embodiment of the invention, a electric storage battery cell jar is provided comprising a molded polymer enclosure having a base and integral mutually-opposing side walls and a cover, including terminal means for electrically connecting the battery in a predetermined manner. A plate support bridge is provided, and includes a plurality of elongate support members positioned on the base of the jar for supporting at least one battery plate in spaced-apart relation above the base. A first array of said support members is provided having a first end adjacent to one of the side walls of the jar and extending outwardly from said side wall at an oblique angle thereto and terminating at a second end remote from any side wall of the jar. The first array of support members is spaced-apart from each other at all points along their respective lengths. A second array of said support members is positioned intermediate said side walls having at least one segment positioned at an angle oblique to said side walls. The second array of support members is spaced-apart from each other at all points along their respective lengths. The first array of said support members and said second array of said support members are collectively spaced on the base of the jar to support each of the plates therein.

According to one preferred embodiment of the invention, the bridge is integrally-formed with the base of the jar.

According to another preferred embodiment of the invention, the jar is molded polypropylene, and said bridge is integrally-molded into the base of the jar.

According to yet another preferred embodiment of the invention, each of the support members which extend at oblique angles to said side walls have a length which is less than one half of the distance between opposing side walls.

According to yet another preferred embodiment of the invention, an electric storage battery cell jar is provided having a base, adjacent perpendicular side walls and opposite parallel side walls, and including a support bridge for supporting a plurality of plates therein. First and second support members are provided having respective first ends adjacent to a first of the side walls of the jar which extend outwardly therefrom at an oblique angle thereto and terminate at a second end remote is from any side wall of the jar. The first and second support members are spaced-apart from each other at all points along their respective lengths. Third and fourth support members are provided having respective first ends adjacent to a second of the side walls parallel to the first of the side walls and extending outwardly therefrom at an oblique angle thereto and terminating at a second end remote from any side wall of the jar, said third and fourth support members being spaced-apart from each other at all points along their respective lengths;

(c) fifth and sixth support members positioned intermediate said side walls and having a plurality of angled segments with at least one of said angled segments positioned at an angle oblique to each of said side walls; and (d) seventh and eighth support members positioned parallel to first and second opposite parallel side walls and perpendicular to third and fourth opposite parallel side walls.

According to yet another preferred embodiment of the invention, the bridge is integrally-formed with the base of the jar.

According to yet another preferred embodiment of the invention, the jar is molded polypropylene, and said bridge is integrally-molded into the base of the jar.

According to yet another preferred embodiment of the invention, each of the support members which extend at oblique angles to said side walls have a length which is less than one half of the distance between opposing side walls.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 5 is a vertical cross section taken along line 5—5 of FIG. 4;

FIG. 6 is a vertical cross section taken along line 6—6 of FIG. 4; and

DESCRIPTION OF THE PREFERRED EMBODIMENT AND BEST MODE

Figure 1:
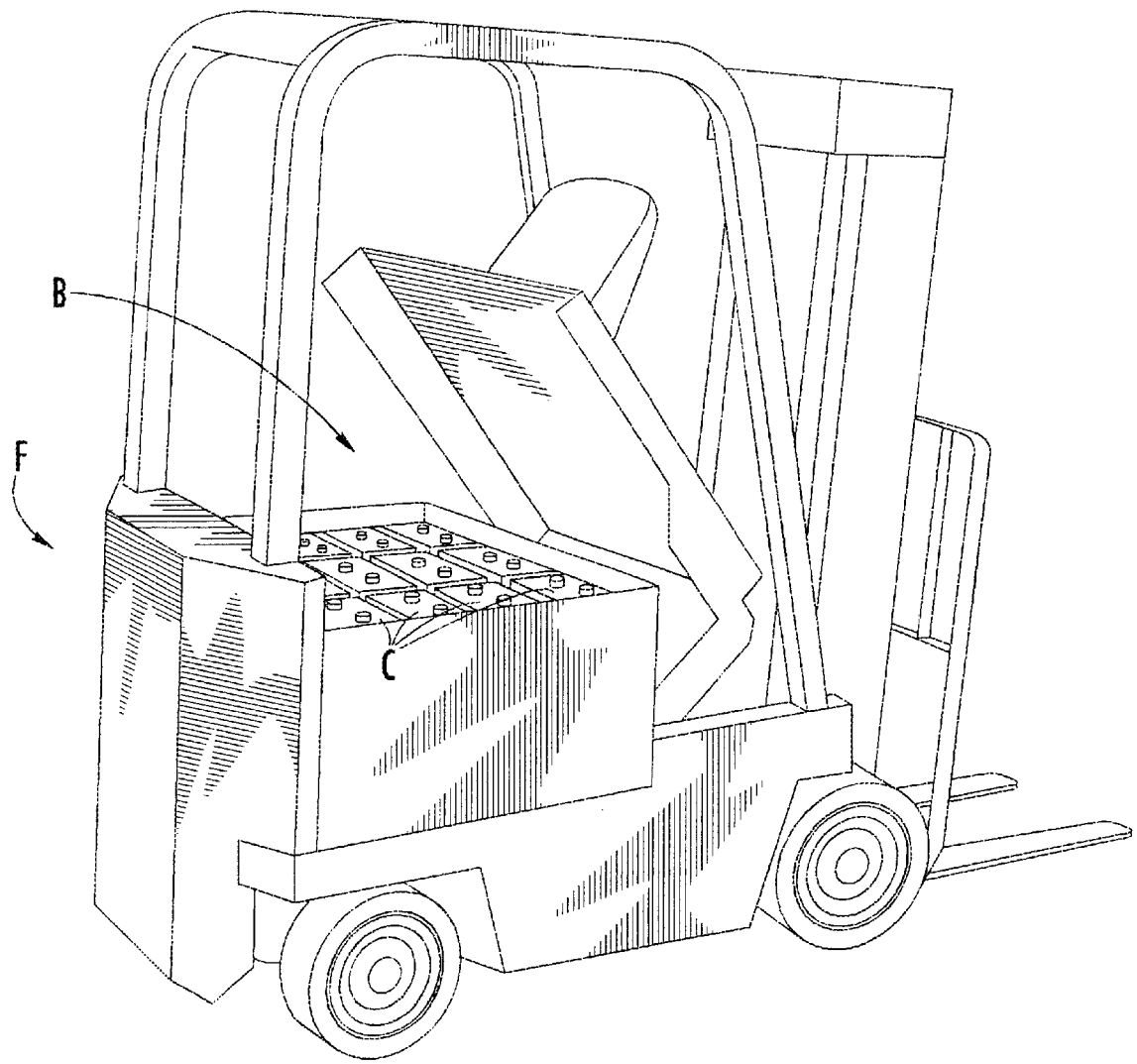
FIG. 1 is a perspective view of a typical forklift with the battery housing cover opened to show the position of the cells comprising the battery.

Referring now specifically to the drawings, an electrically-powered forklift "F" of the type which uses large industrial batteries is generally shown in FIG. 1. The battery "B" is formed of an array of electricity-generating cells "C" which are electrically connected together to form a single electrical output unit. Each of the cells "C" is formed of positive and negative plates submerged in an electrolytic solution with leads connecting to terminals extending through a cover shown generally in FIG. 1.

Figure 2:
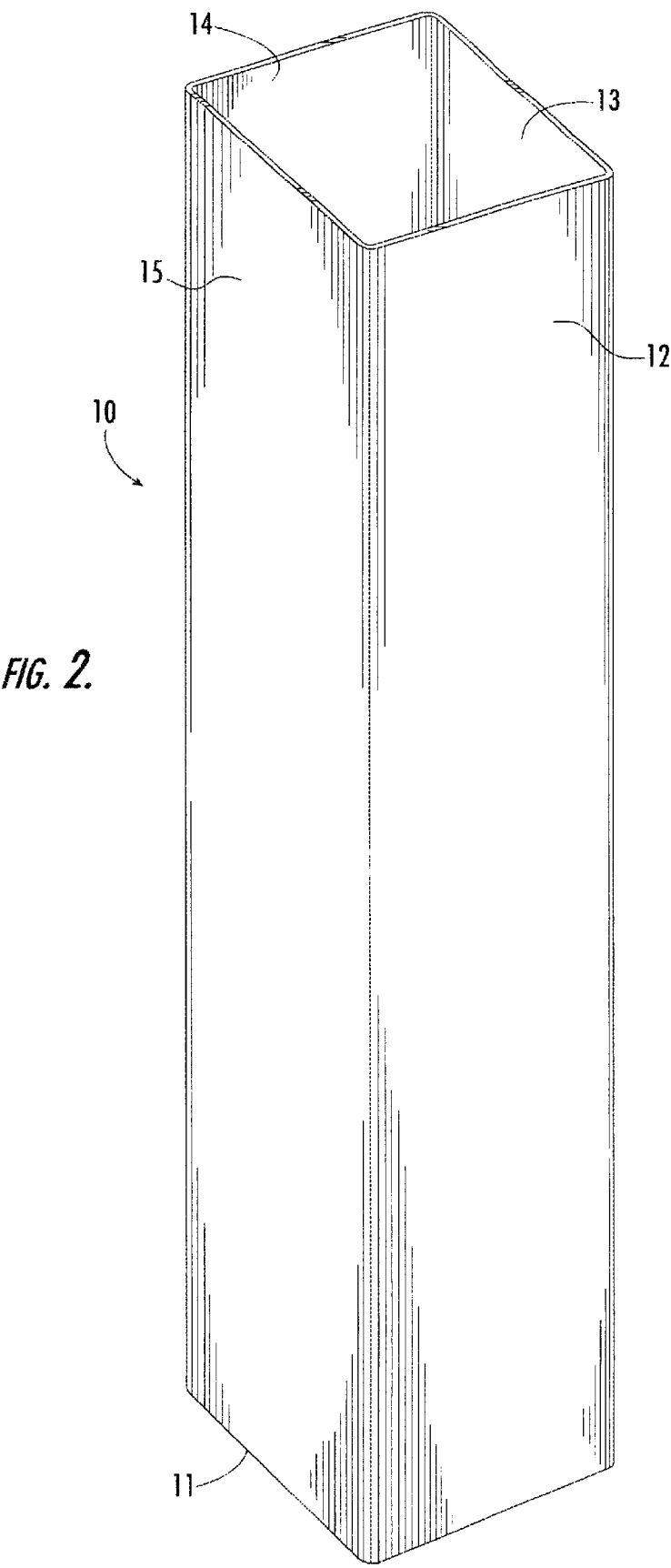
FIG. 2 is a perspective view of a battery cell jar according to an embodiment of the invention.

Referring now to FIG. 2, a jar 10 according to an embodiment of the invention is shown, and includes a base 11 and four side walls 12, 13, 14 and 15 defining a container for the other elements of the cell "C." Jar 10 is preferably injection-molded in a single, integral piece from a polymer such as polypropylene. Such jars are made in many sizes and dimensional proportions. The depth of the jar is generally very large in relation to the length length and width dimensions. For example, a typical jar may be between 50 to 80 cm high, with length and width dimensions of between 12 to 18 cm. Other dimensional relationships are also possible.

Figure 3:
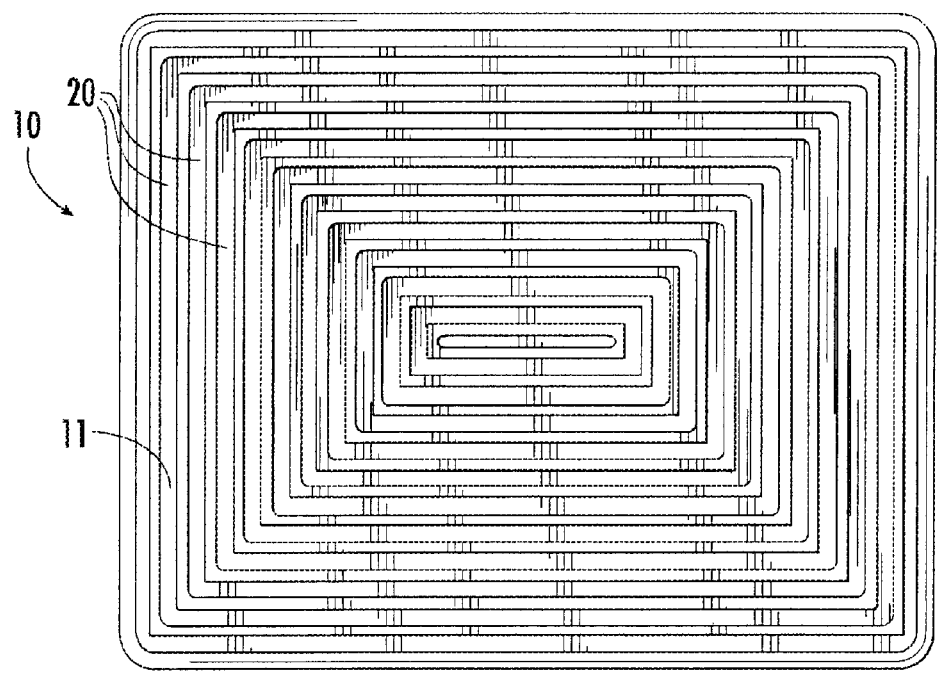
FIG. 3 is a plan view of the exterior of the base of the jar.

As is shown in FIG. 3, the exterior surface of the base 11 is provided with reinforcing ribs 20, which provide rigidity to the base 11 while being relatively lightweight.

Figure 4:
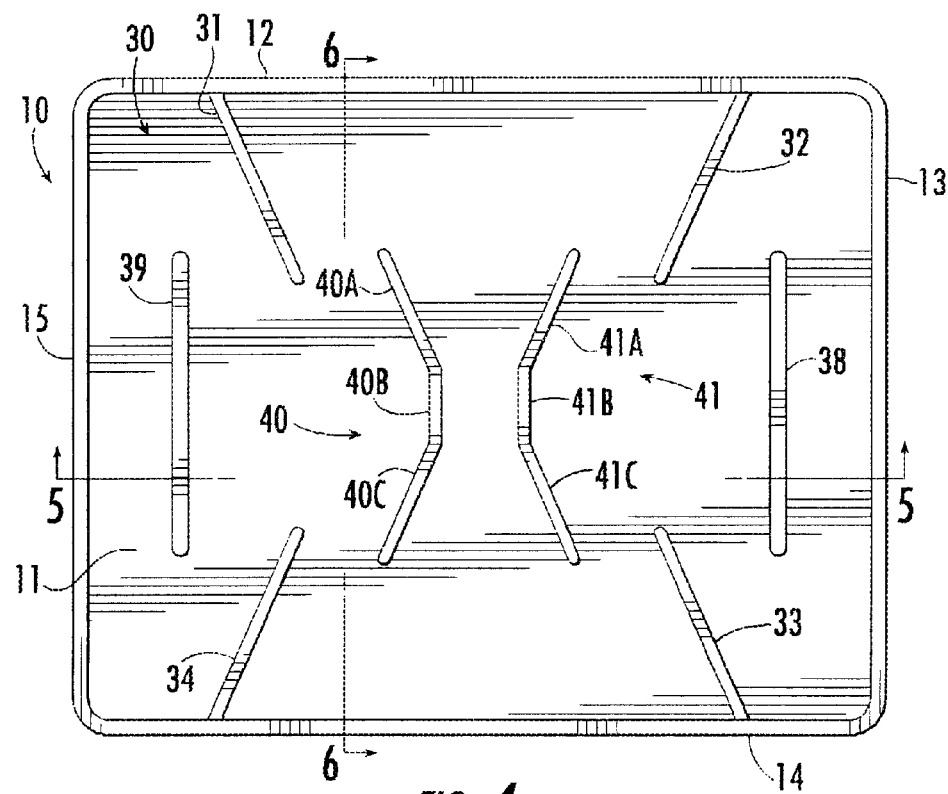
FIG. 4 is a plan view of the interior of the base and bridge of the jar.

The inventive bridge 30 according to one embodiment of the invention is shown in FIG. 4. The bridge 30 is comprised of a plurality of plate support members which support the positive and negative plates of the cell "C." As can be seen, these support members are positioned in several distinct relationships to the walls 12–15 of the jar 10. Specifically, support members 31–34 extend outwardly at an oblique angle from the side walls 12 and 14, respectively. In the embodiment shown, the oblique angle is such that the support members 31–34 are inwardly directed towards the center of the base 11.

Support members 38–39 are positioned in adjacent spaced-apart relation to and extend parallel to side walls 13 and 15, and are spaced-apart and perpendicular to side walls 12 and 14.

Support members 40 and 41 are positioned generally in the center of the base 11 and each comprise three distinct segments 40A, 40B, 40C and 41A, 41B, 41C, respectively. Segments 40A, 40C and 41A, 41C are each positioned at an oblique angle to the side walls 14 and 12, respectively, and diverge from each other, as shown. The relatively short center segments 40B, 41B are parallel to each other and to the side walls 15 and 13, respectively.

This arrangement is shown in cross-section in FIGS. 5 and 6.

Figure 7:
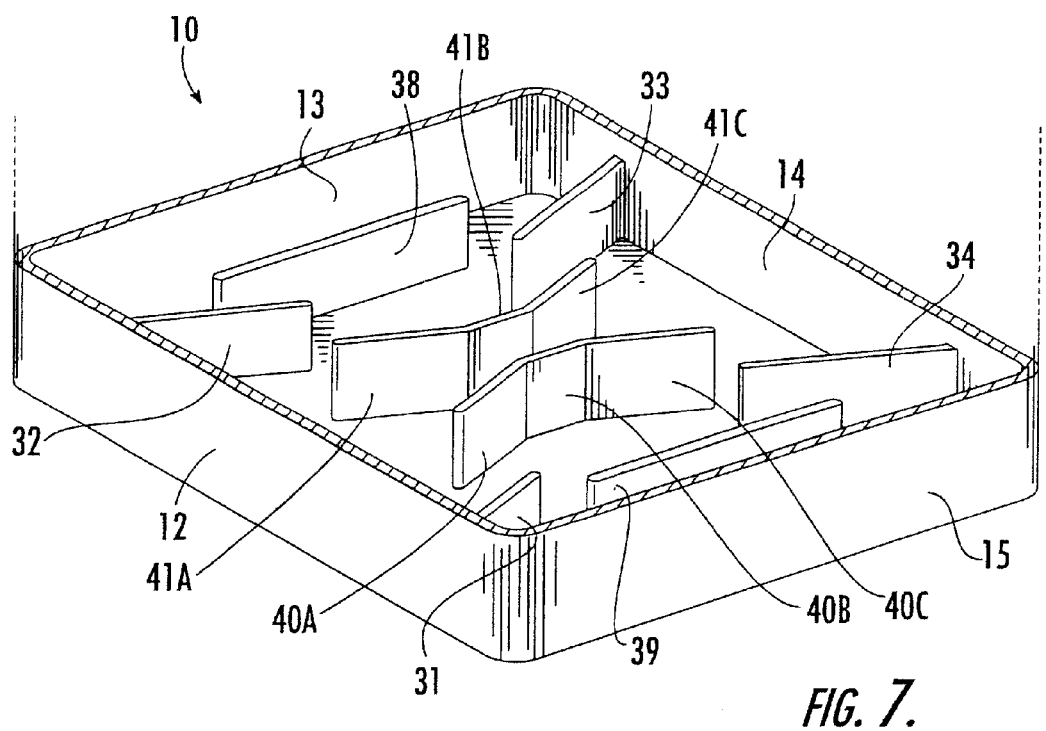
FIG. 7 is a cut away perspective view of the interior of the base and bridge of the jar.

As is shown in FIG. 7, the arrangement of the support members results in no joined parallel or perpendicular surfaces. Sediment is therefore distributed more evenly on the base 11 of the jar 10 and battery failure resulting from short circuits between plates is reduced or eliminated.

A jar for an industrial electric storage battery is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. An electric storage battery cell jar having a base, adjacent perpendicular side walls and opposite parallel side walls, and including a support bridge for supporting a plurality of plates therein, and comprising:

(a) a plurality of elongate support members positioned on said base of the jar for supporting at least one battery plate in spaced-apart relation above the base;

(i) a first array of said support members having a first end adjacent to one of said side walls of the jar and extending outwardly from the side wall at an oblique angle thereto and terminating at a second end remote from any side wall of the jar, said first array of support members being spaced-apart from each other at all points along their respective lengths; and (ii) a second array of said support members positioned intermediate the side walls and having at least one segment positioned at an angle oblique to the side walls, at least one segment extending at an oblique angle to the side walls, and at least one segment extending parallel to at least one of the sidewalls and perpendicular to at least one of said side walls, said second array of support members being spaced-apart from each other at all points along their respective lengths; and (iii) said first array of said support members and said second array of said support members collectively spaced on the base of the jar to support each of the plates therein.

2. A storage battery cell jar according to claim 1, and including a third array of support members positioned in spaced-apart relation to each of the side walls, parallel to at least one of said side walls and perpendicular to at least one of said side walls.

3. A storage battery cell jar according to claim 1, wherein each of the support members which extend at oblique angles to said side walls have a length which is less than one half of the distance between opposing side walls.

4. A storage battery cell jar according to claim 1, and wherein each of the support members which extend at oblique angles to said side walls have a length which is less than one half of the distance between opposing side walls.

5. An electric storage battery cell jar, comprising:
   (a) a molded polymer enclosure having a base and integral mutually-opposing side walls;
   (b) a cover, including terminal means for electrically connecting the battery in a predetermined manner;
   (c) a plate support bridge, comprising:
      (i) a plurality of elongate support members positioned on the base of the jar for supporting at least one battery plate in spaced-apart relation above the base;
      (ii) a first array of said support members having a first end adjacent to one of the side walls of the jar and extending outwardly from said side wall at an oblique angle thereto and terminating at a second end remote from any side wall of the jar, said first array of support members being spaced-apart from each other at all points along their respective lengths; and
      (iii) a second array of said support members positioned intermediate said side walls and having at least one segment positioned at an angle oblique to said side walls, at least one segment extending at an oblique angle to the side walls, and at least one segment extending parallel to at least one of the side walls and perpendicular to at least one of the side walls, said second array of support members being spaced-apart from each other at all points along their respective lengths; and
      (iv) said first array of said support members and said second array of said support members collectively spaced on the base of the jar to support each of the plates therein.

6. A storage battery cell jar according to claim 5, wherein said bridge is integrally-formed with the base of the jar.

7. A storage battery cell jar according to claim 5, wherein said jar is molded polypropylene, and further wherein said bridge is integrally-molded into the base of the jar.

8. A storage battery cell jar according to claim 1, and wherein each of the support members which extend at oblique angles to said side walls have a length which is less than one half of the distance between opposing side walls.

9. An electric storage battery cell jar having a base, adjacent perpendicular side walls and opposite parallel side walls, and including a support bridge for supporting a plurality of plates therein, and comprising:
   (a) first and second support members having respective first ends adjacent to a first of the side walls of the jar and extending outwardly therefrom at an oblique angle thereto and terminating at a second end remote from any side wall of the jar, said first and second support members being spaced-apart from each other at all points along their respective lengths;
   (b) third and fourth support members having respective first ends adjacent to a second of the side walls parallel to the first of the side walls and extending outwardly therefrom at an oblique angle thereto and terminating at a second end remote from any side wall of the jar, said third and fourth support members being spaced-apart from each other at all points along their respective lengths;
   (c) fifth and sixth support members positioned intermediate said side walls and having a plurality of angled segments with at least one of said angled segments positioned at an angle oblique to each of said side walls; and
   (d) seventh and eighth support members positioned parallel to first and second opposite parallel side walls and perpendicular to third and fourth opposite parallel side walls.

10. A storage battery cell jar according to claim 8, wherein said bridge is integrally-formed with the base of the jar.

11. A storage battery cell jar according to claim 8, wherein said jar is molded polypropylene, and further wherein said bridge is integrally-molded into the base of the jar.

12. An electric storage battery cell jar having a base, adjacent perpendicular side walls and opposite parallel side walls, and including a support bridge for supporting a plurality of plates thereon, and comprising:
   (a) a plurality of elongate support members positioned on the base of the jar for supporting at least one battery plate in spaced-apart relation above the base;
      (i) a first array of said support members having a first end adjacent to one of the side walls of the jar and extending outwardly from said side wall at an oblique angle thereto and terminating at a second end remote from any side wall of the jar, said first array of support members being spaced-apart from each other at all points along their respective lengths; and
      (ii) a second array of said support members positioned intermediate said side walls and having at least one segment positioned at an angle oblique to said side walls, said second array of support members being spaced-apart from each other at all points along their respective lengths;
      (iii) said first array of said support members and said second array of said support members collectively spaced on the base of the jar to support each of the plates therein; and
      (iv) a third array of support members positioned in spaced-apart relation to each of the side walls, parallel to at least one of the side walls and perpendicular to at least one of the side walls.

13. A storage battery cell jar according to claim 12, and wherein said second array of support members includes at least one segment extending at an oblique angle to said side walls and at least one segment extending parallel to at least one of said side walls and perpendicular to at least one of said side walls.

14. A storage battery cell jar according to claim 12, wherein said bridge is integrally-formed with the base of the jar.

15. A storage battery cell jar according to claim 12, wherein said jar is molded polypropylene, and further wherein said bridge is integrally-molded into the base of the jar.

* * * * *